(12) United States Patent
Okazaki

(10) Patent No.: US 9,902,211 B2
(45) Date of Patent: Feb. 27, 2018

(54) PNEUMATIC TIRE

(71) Applicant: BRIDGESTONE CORPORATION, Chuo-ku, Tokyo (JP)

(72) Inventor: Naoto Okazaki, Kodaira (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 116 days.

(21) Appl. No.: 15/038,542

(22) PCT Filed: Jun. 12, 2014

(86) PCT No.: PCT/JP2014/003133
§ 371 (c)(1),
(2) Date: May 23, 2016

(87) PCT Pub. No.: WO2015/097925
PCT Pub. Date: Jul. 2, 2015

(65) Prior Publication Data
US 2016/0288585 A1 Oct. 6, 2016

(30) Foreign Application Priority Data

Dec. 27, 2013 (JP) .................. 2013-272922

(51) Int. Cl.
*B60C 15/00* (2006.01)
*B60C 15/04* (2006.01)
(Continued)

(52) U.S. Cl.
CPC ............ *B60C 15/0027* (2013.01); *B60C 3/04* (2013.01); *B60C 9/0292* (2013.01);
(Continued)

(58) Field of Classification Search
CPC ............. B60C 13/003; B60C 15/0027; B60C 15/0063; B60C 15/04; B60C 2013/007; B60C 2200/06; B60C 3/04; B60C 9/0292; B60C 3/00; B60C 3/02; B60C 15/00; B60C 15/024
(Continued)

(56) References Cited

U.S. PATENT DOCUMENTS

2014/0034207 A1 2/2014 Takahashi et al.

FOREIGN PATENT DOCUMENTS

CN 101903196 A 12/2010
CN 103415405 A 11/2013
(Continued)

*Primary Examiner* — Alison L Hindenlang
*Assistant Examiner* — Yunju Kim
(74) *Attorney, Agent, or Firm* — Kenja IP Law PC

(57) ABSTRACT

This disclosure aims to achieve reduction in rolling resistance and ensure excellent steering stability. In this disclosure, a tire widthwise maximum width of a carcass is 1.35 W or less; a tire outer surface has a recess; within a second height range h2 and on the outer side in a tire radial direction with respect to bead cores, a radius of curvature of the carcass is 0.46 h or more; within a third height range h3, the radius of curvature of the carcass is 0.62 h or more; during movement of a virtual point from a bead core height position Hbc toward a third height position H3, a tire gauge at the virtual point is reduced by a reduction amount of 0.025× G0/mm or less; and the tire gauge at the virtual point at the third height position H3 is 10% or more of the tire widthwise maximum width of the bead core.

4 Claims, 2 Drawing Sheets

(51) Int. Cl.
    *B60C 3/04*     (2006.01)
    *B60C 13/00*     (2006.01)
    *B60C 9/02*     (2006.01)

(52) U.S. Cl.
    CPC ........ *B60C 13/003* (2013.01); *B60C 15/0063* (2013.01); *B60C 15/04* (2013.01); *B60C 2013/007* (2013.01); *B60C 2200/06* (2013.01)

(58) Field of Classification Search
    USPC ........................................................ 152/454
    See application file for complete search history.

(56) References Cited

FOREIGN PATENT DOCUMENTS

| | | |
|---|---|---|
| EP | 2641751 A1 | 9/2013 |
| EP | 2821259 A1 | 1/2015 |
| JP | H10-193924 A | 7/1998 |
| WO | 2009/051260 A1 | 4/2009 |
| WO | 2012147356 A1 | 11/2012 |
| WO | 2013/111576 A1 | 8/2013 |
| WO | 2013128853 A1 | 9/2013 |

PNEUMATIC TIRE

TECHNICAL FIELD

This disclosure relates to a pneumatic tire.

BACKGROUND

In recent years, with regards to various pneumatic tires inclusive of pneumatic tires for heavy load vehicle such as truck, bus and the like, tires of low fuel consumption are demanded, and as a solution for it, reduction in tire weight has been considered so as to reduce rolling resistance.

There is a tire provided with a recess on the side rubber of the outer side surface of the tire for the purpose of reduction in weight of tire (e.g., PTL 1). It is discussed in the document that, according to this tire, it is possible to achieve reduction in rolling resistance and low fuel consumption via reduction in tire weight.

CITATION LIST

Patent Literature

[PTL 1] WO2009/051260A1

SUMMARY

Technical Problem

However, in the pneumatic tire as described in PTL 1, in a cross section along the tire width direction, the tire gauge measured along the normal line of the carcass is locally thin in a portion having a recess disposed in the vicinity of the bead portion, and thus the rigidity of the portion is reduced, which reduces the lateral spring constant. In this way, as illustrated in FIG. 2, when a side force SF is exerted on the tire in the tire width direction during cornering of a vehicle, etc., the tire is greatly deformed in a manner that the side portion on the side-force-exerted side sinks into the ground, and simultaneously, the side portion opposite to the side-force-exerted side rises above the ground, where the portion having reduced thickness due to the recess 100 serves as a bending position (fulcrum) F'. Due to reduction of tire ground-contacting area on the side rising above the ground, there is concern of reduction in cornering force and reduction in steering stability.

This disclosure aims to solve the problem of the aforementioned concern, and its purpose is to provide a pneumatic tire capable of achieving reduction in rolling resistance and ensuring excellent steering stability.

Solution to Problem

The pneumatic tire of this disclosure comprises: a pair of bead cores respectively embedded in a pair of bead portions, and a carcass including at least one carcass ply toroidally extending between the pair of bead cores, wherein:

when the tire is mounted to an applicable rim and at an unloaded state while a normal maximum internal pressure is applied, a tire widthwise maximum width of the carcass is 1.35 W or less, where W is a tire widthwise distance between each bead heel of the pair of bead portions; and when the tire is mounted to the applicable rim and at the unloaded state while substantively no internal pressure is applied, in a cross section along the tire width direction, a tire outer surface has a recess on the inner side in a tire radial direction with respect to a tire maximum width position and on the outer side in the tire radial direction with respect to a separation point of the tire outer surface of the bead portions from a rim flange, when h is a tire radial maximum height of the carcass, and when a first height position H1, a second height position H2 and a third height position H3 are height positions spaced respectively by 0.10 h, 0.26 h and 0.48 h from a tire radial innermost position of the carcass toward the outer side in the tire radial direction, a radius of curvature of the carcass is 0.46 h or more within a second height range h2 from a first height position H1 to a second height position H2 and on the outer side in the tire radial direction with respect to the bead cores, and the radius of curvature of the carcass is 0.62 h or more within a third height range h3 from the second height position H2 to the third height position H3; and when a bead core height position Hbc is a tire radial outermost height position of a virtual point on the carcass with respect to the tire radial innermost position of the carcass in the case where a normal line of the carcass at the virtual point on the carcass penetrates the bead core, and when G0 is a tire gauge measured along the normal line of the carcass at the virtual point at the bead core height position Hbc, a tire gauge measured along the normal line of the carcass at the virtual point is reduced by a reduction amount of $0.025 \times G0$/mm or less during movement of the virtual point along the carcass from the bead core height position Hbc toward the third height position H3, and the gauge at the virtual point located at the third height position H3 is 10% or more of the tire widthwise maximum width of the bead core.

According to the pneumatic tire of this disclosure, it is possible to achieve reduction in rolling resistance through reduction in tire weight, and simultaneously ensure excellent steering stability.

Here, the "applicable rim" is a valid industrial standard for the region in which the tire is produced or used, and refers to a standard rim of an applicable size (the "Measuring Rim" in the STANDARDS MANUAL of ETRTO (the European Tyre and Rim Technical Organization in Europe), and the "Design Rim" in the "YEAR BOOK" of TRA (the Tire and Rim Association, Inc.)) according to the "JATMA Year Book" of the JATMA (Japan Automobile Tire Manufacturers Association) in Japan, the "STANDARDS MANUAL" of ETRTO in Europe, or the "YEAR BOOK" of TRA in the United States of America. Moreover, the "normal maximum internal pressure" refers to an air pressure corresponding to a maximum load capability at applicable size and ply rating, as described in the aforementioned JATMA YEAR BOOK, etc.

In the pneumatic tire of this disclosure, it is preferable that the carcass includes folded-up portions folded up around the bead cores from the inner side in the tire widthwise direction toward the outer side in the tire widthwise direction, and an end of the folded-up portion of the carcass is located on the inner side in the tire radial direction with respect to the tire radial outermost position of the rim flange.

Thereby, it is possible to form a larger recess on the tire outer surface, and to thereby achieve further reduction in weight and reduction in rolling resistance.

In the pneumatic tire of this disclosure, it is more preferable that the folded-up portion of the carcass includes wound portions which are wound around the bead cores along the circumference of the bead cores.

Thereby, it is possible to form a larger recess on the tire outer surface, and to thereby achieve further reduction in weight and reduction in rolling resistance, and simultaneously prevent the carcass from being pulled out from the circumferences of the bead cores.

In the pneumatic tire of this disclosure, it is preferable that within the second height range h2 and on the outer side in the tire radial direction with respect to the bead cores, the radius of curvature of the carcass is 0.51 h or more, while a center of curvature of the carcass is located on the tire inner side with respect to the carcass.

Thereby, a tension of the carcass is increased, and it is possible to further suppress deformation of the tire when a side force is exerted.

Advantageous Effect

According to this disclosure, it is possible to provide a pneumatic tire achieving reduction in rolling resistance and ensuring excellent steering stability.

DETAILED DESCRIPTION

Embodiments of the present invention will be exemplified based on the drawings.

Figure 1:
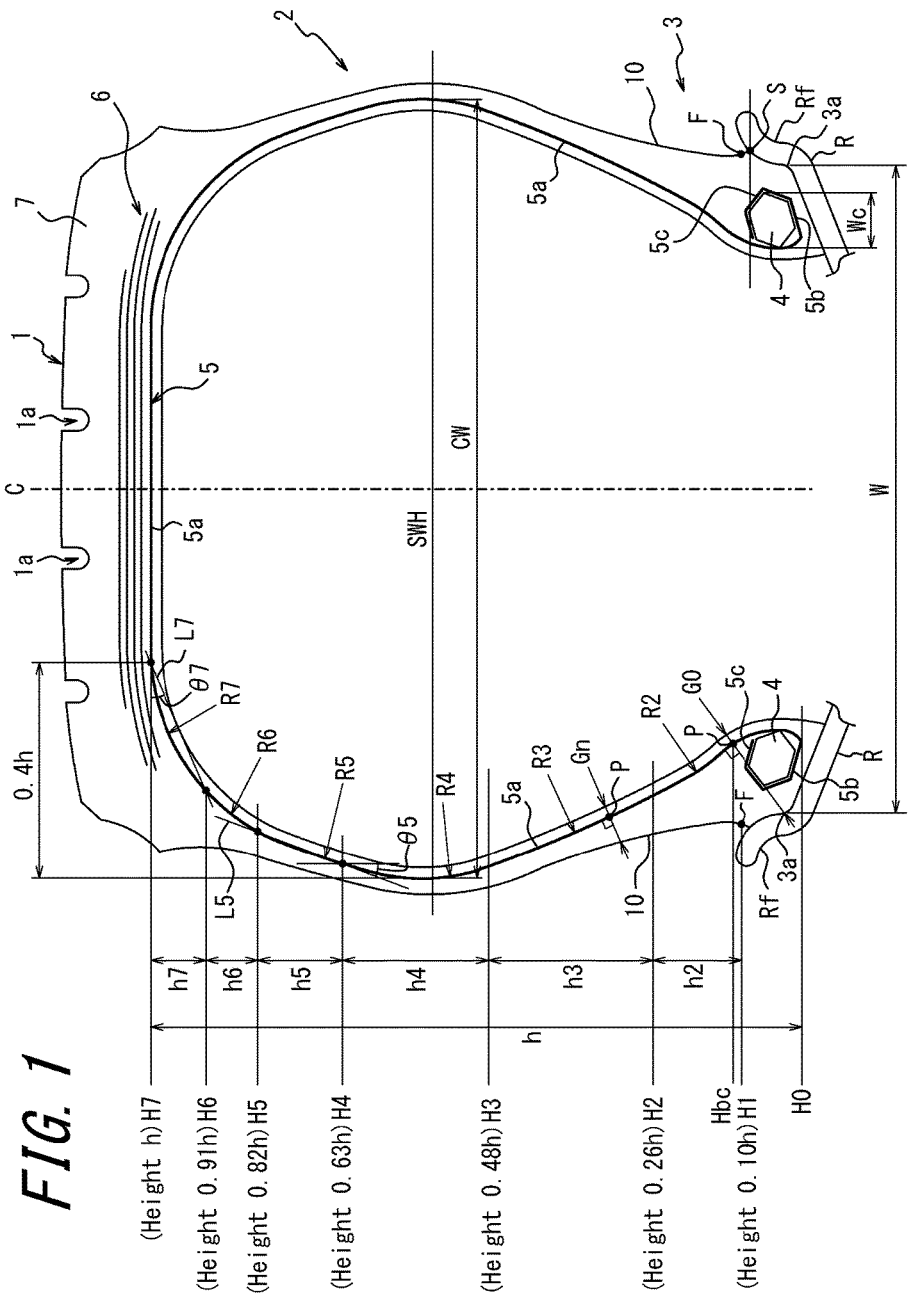
FIG. 1 illustrates a tire widthwise cross sectional view of an embodiment of the pneumatic tire of this disclosure.

FIG. 1 illustrates an embodiment of the pneumatic tire (hereinafter referred to as merely "the tire" occasionally) of this disclosure. Here, the tire as described in the present embodiment is particularly preferable to be used as a pneumatic tire for heavy load vehicle such as truck, bus and the like, but this disclosure is applicable as well to a pneumatic tire used in vehicles of other types. In the example of FIG. 1, the structure of the tire is symmetrical with respect to a tire equatorial plane C, but may be asymmetrical with respect to the tire equatorial plane C instead.

The tire as illustrated in FIG. 1 includes a tread portion 1; a pair of sidewall portions 2 extending respectively from both tire widthwise ends of the tread portion 1 toward the tire radial inner side; and a pair of bead portions 3 respectively continuing from the sidewall portions 2 to the tire radial inner side. This tire includes a pair of bead cores 4, which are respectively embedded in the aforementioned bead portions 3, and have a hexagonal cross section in the drawing; and a carcass 5 including at least one (one in the example of the drawing) carcass ply toroidally extending between the bead cores 4. The carcass ply is formed by applying rubber coating to cords made of steel, organic fibers, etc. In the example of the drawing, the carcass 5 includes a main body 5a toroidally extending between the bead cores 4, and a pair of folded-up portions 5b extending from both ends of the main body 5a and being folded up around the bead cores 4 from the tire widthwise inner side toward the tire widthwise outer side. On the outer side in the tire radial direction with respect to a crown region of the carcass 5 of the tread portion 1, a belt 6, which includes a plurality of belt layers, and a tread rubber 7 are arranged in order; and on the tire outer surface of this tread rubber 7, a tread pattern including, e.g., a plurality of circumferential grooves 1a extending in the tire circumferential direction, etc. is formed.

When this tire is mounted to an applicable rim R and at an unloaded state while a normal maximum internal pressure is applied, in the tire of this disclosure, it is required that a tire widthwise maximum width CW of the carcass 5 is 1.35 W or less, where W is the tire widthwise distance between each bead heel 3a of the pair of bead portions 3 at this state. Here, the "tire widthwise maximum width CW of the carcass 5" refers to the tire widthwise length between tire widthwise outermost positions of the carcass 5.

If the tire widthwise maximum width CW of the carcass 5 is more than 1.35 W, the carcass 5 would be shaped such that portions of the main body 5a of the carcass 5 in the vicinity of the bead portions 3 are collapsed on the ground. In such shape, the portions of the carcass 5 in the sidewall portions 2 are greatly bent, and thus sufficient tension cannot be exerted on those portions. Therefore, by only a slight side force exerted on the tire, the tire is deformed such that the side-force-exerted side of the sidewall portions 2 sinks into the ground, and simultaneously and the side opposite to the side-force-exerted side of the sidewall portions 2 rises up from the ground, which leads to a risk of reduction in ground-contacting area and cornering force, and deterioration in steering stability. By setting the tire widthwise maximum width CW of the carcass 5 to 1.35 W or less, the portions of the main body 5a of the carcass 5 at the sidewall portions 2 extend more straight, and thus it is possible to suppress reduction in tension in these portions, and thereby suppress deformation of the tire when a side force is exerted. From the same viewpoint, the tire widthwise maximum width CW of the carcass 5 is preferably set to 1.28 W or less.

On the other hand, if the tire widthwise maximum width CW of the carcass 5 is set too small, there is a risk that the cords of the carcass 5 are severed due to excess increase in the tension of the carcass 5. Therefore, from the viewpoint of durability, the tire widthwise maximum width CW of the carcass 5 is preferably set to 1.20 W or more.

Hereinafter described are the dimensions and shape of the tire in a cross section along the tire width direction in the case where the tire is mounted to the applicable rim R and at an unloaded state while substantively no internal pressure is applied. Here, "substantively no internal pressure is applied" refers to the case where the internal pressure of the tire is an extremely low internal pressure of the minimum value necessary for the tire to support its load and maintain its shape when mounted to the rim, e.g., 30 kPa to 50 kPa. Here, for convenience, FIG. 1 is illustrated without showing the difference in tire shape between the case where the tire is mounted to the applicable rim R and at an unloaded state while a normal maximum internal pressure is applied, and the case where the tire is mounted to the applicable rim R and at an unloaded state while substantively no internal pressure is applied.

As shown in FIG. 1, on the inner side in the tire radial direction with respect to a tire maximum width position SWH, and on the outer side in the tire radial direction with respect to a separation point S of the tire outer surface of the bead portion 3 from a rim flange Rf, the tire outer surface has a recess 10 depressed toward the tire inner side. Here, the "tire maximum width position SWH" refers to a tire radial position at which the tire widthwise distance between tire outer surfaces of the pair of sidewall portions 2 becomes the maximum. By providing the recess 10, the rubber amount of the tire is reduced as compared to the case where the recess 10 is not provided, and thus it is possible to achieve reduction in weight of the tire, reduction in rolling resistance and low fuel consumption.

In the illustrated example, the tire maximum width position SWH is at a tire radial position approximately the same as a carcass maximum width position (a tire radial position at which the tire widthwise distance between the carcass 5 at the pair of sidewall portions 2 becomes the maximum), however these positions may be different from each other.

When h is a tire radial maximum height of the carcass, the first height position H1, the second height position H2 and the third height position H3 are respectively height positions spaced respectively by 0.10 h, 0.26 h and 0.48 h from a tire radial innermost position H0 of the carcass toward a tire radial outer side. In the tire of this disclosure, it is required that within the second height range h2 from the first height position H1 to the second height position H2 and on the outer side in the tire radial direction with respect to the bead cores 4, the radius of curvature R2 of the carcass 5 is 0.46 h or more. Moreover, in the tire of this disclosure, it is required that within the third height range h3 from the second height position H2 to the third height position H3, the radius of curvature R3 of the carcass 5 is 0.62 h or more.

The "tire radial maximum height (h) of the carcass 5" refers to the tire radial distance from the tire radial innermost position H0 of the carcass 5 to the tire radial outermost position (hereinafter referred to as "the seventh height position" as well) H7 of the carcass 5. Moreover, the radius of curvature R2 and R3 may be either constant within the respective height ranges, or respectively varying within the aforementioned numerical ranges. Moreover, "within the second height range h2 and on the outer side in the tire radial direction with respect to the bead cores 4" refers to the overlapping region of the region of the second height range h2 and the region on the outer side in the tire radial direction with respect to the bead cores 4 (i.e., on the outer side in the tire radial direction with respect to the tire radial outermost position of the bead cores 4). Further, the "radius of curvature of the carcass 5" refers to the radius of curvature of the main body 5a of the carcass 5. In the case where the carcass 5 contains a plurality of carcass plies, the radius of curvature of a virtual intermediate line extending exactly in the middle of the carcass ply on the tire outermost side and the carcass on the tire innermost side should be measured as the radius of curvature of the carcass 5.

The part of the carcass 5 having the radius of curvature R2 (i.e. the part within the second height range h2 and on the outer side in the tire radial direction with respect to the bead cores 4) has a center of curvature on the tire inner side with respect to the corresponding part of the carcass 5 in the illustrated example, but may have a center of curvature on the tire outer side with respect to corresponding part of the carcass 5 instead. Moreover, in the illustrated example, the part of the carcass 5 having the radius of curvature R3 (i.e., the part within the third height range h3) has a center of curvature on the tire inner side with respect to the corresponding part of the carcass 5. Here, "the tire inner side" and "the tire outer side" respectively refer to the inner cavity side and the outer surface side of the tire.

As apparent from FIG. 1, since the gauge Gn of the tire measured along the normal line of the carcass 5 (hereinafter referred to as merely "tire gauge") within the third height range h3 is thinner as compared to the second height range h2, it is expected that, in some cases, deformation of the tire due to side force is likely to occur within the third height range h3. Thus, by setting the radius of curvature R3 of the carcass 5 within the third height range h3 to a comparatively high value of 0.62 h or more, the carcass 5 within the third height range h3 extends more straight, and thereby, high tension can be exerted on this part of the carcass 5, and deformation of the tire due to side force can be suppressed. From the same viewpoint, this radius of curvature R3 is preferably 1.546 h or more.

On the other hand, within the second height range h2 and on the outer side in the tire radial direction with respect to the bead cores 4, since the tire gauge Gn is comparatively thick, by setting the radius of curvature R2 of the carcass 5 to 0.46 h or more, it is possible to sufficiently suppress deformation of the tire within this height range due to side force.

Moreover, within the second height range h2 and on the outer side in the tire radial direction with respect to the bead cores 4, it is preferable that the radius of curvature R2 of the carcass 5 is 0.51 h or more, and the center of curvature of the carcass 5 is located on the tire inner side with respect to the carcass 5. Thereby, higher tension can be exerted on the carcass 5 within this height range, and deformation of the tire due to side force can be further suppressed. Here, the radius of curvature R2 may be either constant within the height range, or varying within the aforementioned numerical range.

If the radius of curvature R2 and R3 of the carcass 5 is too large, there is a risk that ozone crack occurs due to surface strain of the sidewall portion 2. Therefore, from the viewpoint of durability, R2 and R3 are preferably 1.44 h or less and 2.06 h or less, respectively, but may also be respectively infinite. In case they are infinite, the corresponding parts of the carcass 5 would extend linearly.

Next, G0 is the tire gauge measured along the normal line of the carcass 5 at a virtual point P at a bead core height position Hbc, where the bead core height position Hbc is the tire radial outermost height position of the virtual point P with respect to the tire radial innermost position H0 of the carcass 5 when the normal line of the carcass 5 at the virtual point P on the carcass 5 penetrates the bead core 4. In the tire of this disclosure, it is required that when the virtual point P moves along the carcass 5 from the bead core height position Hbc toward the third height position H3, the tire gauge Gn measured along the normal line of the carcass 5 at the virtual point P is reduced by a reduction amount of $0.025 \times G0$/mm or less. Further, in the tire of this disclosure, it is required that the tire gauge Gn when the virtual point P is at the third height position H3, i.e., the minimum value of the gauge Gn while the virtual point P moves along the carcass 5 from the bead core height position Hbc toward the third height position H3, is 10% or more of the tire widthwise maximum width Wc of the bead core 4.

As to the phrase "tire radial outermost height position Hbc of the virtual point P with respect to the tire radial innermost position H0 of the carcass 5 when the normal line of the carcass 5 at the virtual point P on the carcass 5 penetrates the bead cores 4", suppose one selects a normal line, among the normal lines of the carcass 5 at virtual points P on the carcass 5, which penetrates the bead core 4 when the virtual point P on the normal line is at its tire radial outermost position, the phrase refers to the height position of the virtual point P on the selected normal line from the tire radial innermost position H0 of the carcass 5 toward the tire radial outer side. Moreover, the "reduction amount of $0.025 \times G0$/mm or less" means that the reduction amount of the gauge Gn is more than 0 and less than 0.025 G0 in every 1 mm that the virtual point P moves along the carcass 5. Further, the "tire widthwise maximum width Wc of the bead core 4" refers to the tire widthwise length of the bead cores 4 between the tire widthwise outermost position and the tire widthwise innermost position of the bead core 4.

By reducing the tire gauge Gn at the virtual point P by a reduction amount within 0.025×G0/mm while the virtual point P moves along the carcass 5 from the bead core height position Hbc toward the third height position H3, there is no portion in the region between the bead core height position Hbc and the third height position H3 in which the gauge Gn is greatly reduced and the rigidity is greatly deteriorated locally. Therefore, the tire is more unlikely to generate portions which serve as bending positions in response to a side force.

Similarly, by setting the tire gauge Gn at the virtual point P at the third height position H3 to 10% or more of the tire widthwise maximum width Wc of the bead core 4, the tire gauge Gn can be sufficiently ensured within the region between the bead core height position Hbc and the third height position H3, and the tire is more unlikely to generate portions which serve as bending positions in response to a side force.

Figure 2:
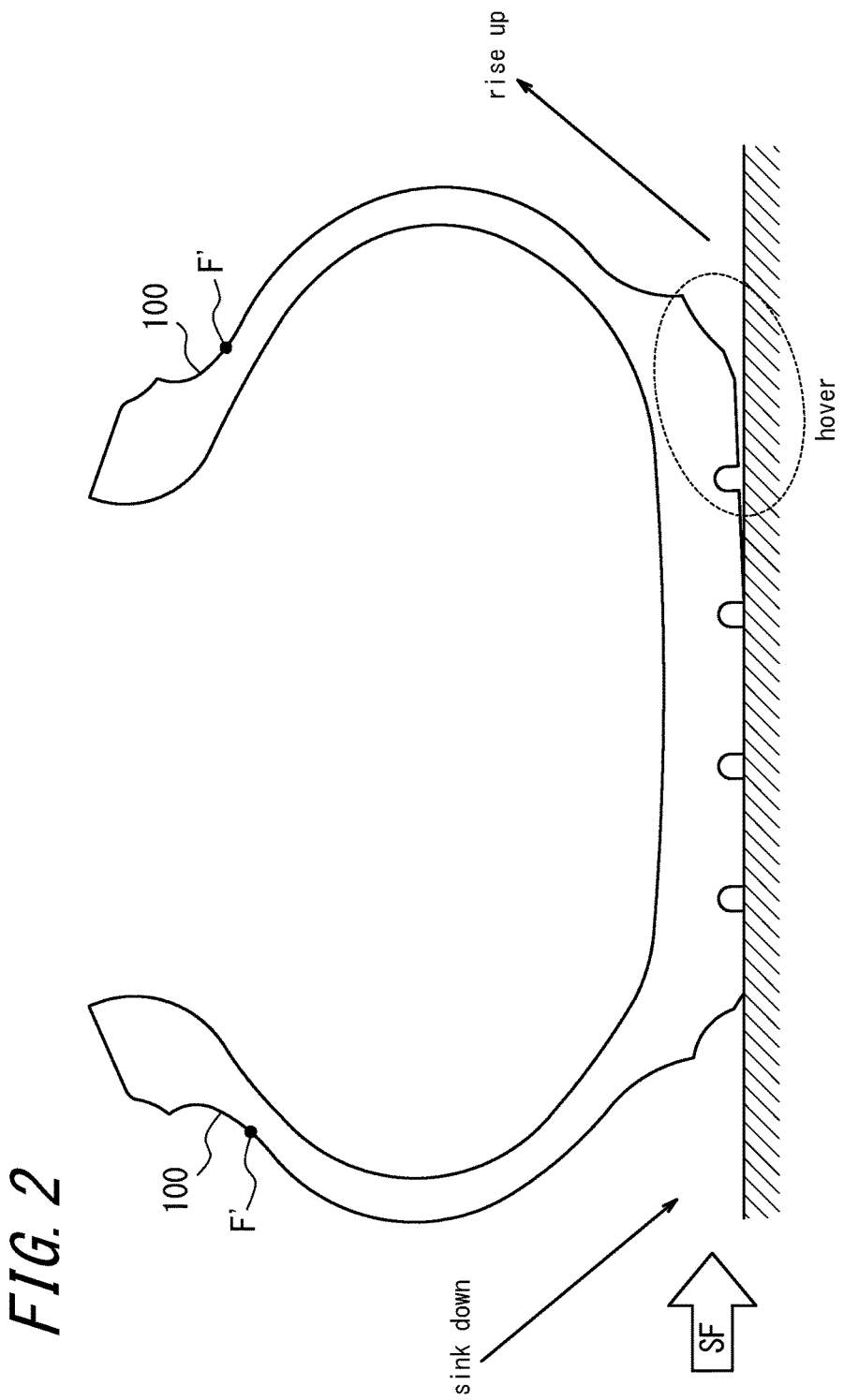
FIG. 2 illustrates a tire widthwise cross sectional view for describing deformation of a conventional pneumatic tire when a side force is exerted.

According to the configuration as described above, by providing the recess 10, it is possible to achieve reduction in tire weight, reduction in rolling resistance and low fuel consumption, as compared to the case of not providing the recess 10. Further, in the conventional example of FIG. 2 where the recess 100 is provided, the bending positions F' of the tire in response to side force exist in the portions where the tire gauge is thin due to the recess 100, whereas, in the present example, the bending positions F are located at portions having thicker tire gauge and located at the inner side in the tire radial direction (i.e., portions in the vicinity of the separation point S of the tire outer surface of the bead portion 3 from the rim flange Rf). Thereby, as compared to the conventional tire with a recess provided, it is possible to suppress deformation of the tire when a side force is exerted, and to achieve increase in ground-contacting area and improvement in steering stability when a side force is exerted. In this way, according to the tire of the present example, by disposing the recess 10, it is possible to reduce the rubber amount, and sufficiently suppress deformation of the tire when a side force is exerted, without adding any member, e.g., adding a reinforcement layer on a tire outer side of the carcass 5. Therefore, it is possible to achieve reduction in rolling resistance due to reduction in tire weight, and simultaneously ensure excellent steering stability.

Further, as illustrated in FIG. 1, it is preferable that the carcass 5 includes folded-up portions 5b, and the end of the folded-up portion 5b of the carcass 5 is located on the inner side in the tire radial direction with respect to the tire radial outermost direction of the rim flange Rf. As compared to the case where the end of folded-up portion 5b is located on the outer side in the tire radial direction with respect to the tire radial outermost position of the rim flange Rf, it is possible to form a larger recess 10 on the tire outer surface. Therefore, it becomes possible to further reduce the tire weight and the rolling resistance.

Further, in this case, as illustrated in FIG. 1, the folded-up portion 5b of the carcass 5 more preferably includes a wound portion 5c which is wound along the circumferences of the bead cores 4. This also makes it possible to form a larger recess 10 on the tire outer surface, and thus reduce the tire weight and the rolling resistance. It is also possible to securely fix the wound portion 5c to the circumferences of the bead cores 4, and therefore, the carcass 5 can be prevented from being pulled out from the circumferences of the bead cores 4.

Next, as illustrated in FIG. 1, the fourth height position H4, the fifth height position H5 and the sixth height position H6 are respectively height positions spaced respectively by 0.63 h, 0.82 h and 0.91 h from the tire radial innermost position H0 of the carcass toward the tire radial outer side. Further, the range from the third height position H3 to the fourth height position H4 is referred to as a fourth height range h4, the range from the fourth height position H4 to the fifth height position H5 is referred to as a fifth height range h5, the range from the fifth height position H5 to the sixth height position H6 is referred to as a sixth height range h6, and the range from the sixth height position H6 to the seventh height position H7 is referred to as a seventh height range h7.

It is preferable that a radius of curvature R7 of the carcass 5 within the seventh height range h7 is 0.26 h or more, and an inclination angle θ7 on the acute angle side of a straight line L7 with respect to the tire width direction is 14° or more, where the straight line L7 connects the virtual point P on the carcass 5 at the sixth height position H6 and the virtual point P on the carcass 5 at a tire widthwise position spaced by 0.4 h inner in the tire width direction from the tire widthwise outermost position of the carcass 5.

Moreover, an intermediate value R6 of the radius of curvature of the carcass 5 within the sixth height range h6 is preferably less than the radius of curvature R7 within the seventh height range h7, and is more preferably 0.13 h to 0.26 h. Here, the "intermediate value R6 of the radius of curvature" refers to the exact intermediate value of the lower limit value and the upper limit value ((lower limit value+ upper limit value)/2) of the radius of curvature of the carcass 5 within the sixth height range h6.

It is preferable that a radius of curvature R5 of the carcass 5 within the fifth height range h5 is larger than the intermediate value R6 of the radius of curvature within the sixth height range h6, and that an inclination angle θ5 on the acute angle side of a straight line L5 with respect to the tire radial direction is 23° or less, where the straight line L5 connects the virtual points on the carcass 5 at the tire radial innermost and outermost positions of the fifth height range h5 (i.e., at the fourth height position H4 and the fifth height position H5). Moreover, the aforementioned radius of curvature R5 is more preferably 0.82 h or more.

It is preferable that the radius of curvature R4 of the carcass 5 within the fourth height range h4 is 0.39 h or more, and the carcass maximum width position is located within the fourth height range h4.

Here, as long as the aforementioned conditions are respectively satisfied, R4, R5 and R7 may be either constant or varying respectively within the height ranges h4, h5 and h7.

When a side force is exerted on the tire, the aforementioned conditions of R4 to R7, θ5 and θ7 respectively generate a larger cornering force to the tire to balance this side force, and contribute to more excellent steering stability.

EXAMPLES

Examples of this disclosure are described hereinafter. Tires of examples 1 to 7 and comparative examples 1 to 6 (each having the tire size of 275/80R22.5) were manufactured experimentally, and rolling resistance and steering stability thereof were evaluated. The "gauge reduction amount≤0.025×G0/mm" in Table 1 refers to the configuration where while the virtual point moves along the carcass from the bead core height position Hbc toward the third height position H3, the tire gauge Gn measured along the normal line of the carcass at the virtual point is reduced by a reduction amount within 0.025×G0/mm. In the tire of Comparative Example 5, the reduction amount of the tire gauge Gn exceeded 0.025×G0/mm at a height position spaced by about 0.30 h from the tire radial innermost position H0 of the carcass 5 toward the tire radial outer side. The "R2/h", "R3/h" and "gauge at H3/Wc" in Table 1 were measured when the tire was mounted to an applicable rim and was at an unloaded state and an internal pressure of 50 kPa was applied. The "CW/W" in Table 1 was measured when the tire was mounted to an applicable rim and was at an unloaded state and a normal maximum internal pressure was applied.

(Rolling Resistance)

Each sample tire was mounted to a rim having the size of 22.5×8.25, an internal pressure of 900 kPa was applied to the tire, and the rolling resistance of the tire was measured on a driving-test drum under a load of 33.7 kN while rolling the drum at a speed of 80 Km/h. This measurement of rolling resistance was performed with a force method and using a smooth drum according to ISO18164. The results were as shown in Table 1. The results were obtained via index evaluation of inverse numbers of rolling resistance of each tire, with the rolling resistance index of the tire of Comparative Example 1 being 100. Here, a larger index means more excellent rolling resistance.

(Steering Stability)

Each sample tire was mounted to a rim having a size of 22.5×7.5, an internal pressure of 900 kPa was applied to the tire, the tire was installed to a vehicle, whereby the vehicle was driven on a test course having a dry road surface, and the steering stability was evaluated via feeling assessment by the driver. The results of index evaluation were as shown in Table 1, with the test result of the tire of Comparative Example 1 being 100. A higher value means a better steering stability.

Comparative Examples 1 to 6. In view of this, it was confirmed that, according to the pneumatic tire of this disclosure, it is possible to achieve reduction in rolling resistance, and simultaneously ensure excellent steering stability.

INDUSTRIAL APPLICABILITY

This disclosure may be utilized in various pneumatic tires inclusive of pneumatic tires for heavy load vehicle, e.g., truck, bus, etc.

REFERENCE SIGNS LIST 1 tread portion
1a circumferential groove
2 sidewall portion
3 bead portion
3a bead heel
4 bead core
5 carcass
5a main body
5b folded-up portion
5c wound portion
6 belt
7 tread rubber
10, 100 recess
C tire equatorial plane
CW tire widthwise maximum width of carcass
F, F' bending position
G0, Gn gauge
h tire radial maximum height of carcass
h2 to h7 height range
H0 tire radial innermost position of carcass
H1 to H7, Hbc height position
SWH tire maximum width position
P virtual point
R applicable rim
Rf rim flange
R2 to R7 radius of curvature
S separation point
SF side force
W tire widthwise distance between bead heels
Wc tire widthwise maximum width of bead core

TABLE 1

|   | Comparative Example Tire 1 | Comparative Example Tire 2 | Comparative Example Tire 3 | Comparative Example Tire 4 | Comparative Example Tire 5 | Comparative Example Tire 6 | Example Tire 1 | Example Tire 2 | Example Tire 3 | Example Tire 4 | Example Tire 5 | Example Tire 6 | Example Tire 7 |
|---|---|---|---|---|---|---|---|---|---|---|---|---|---|
| R2/h | 0.51 | 0.3 | 0.51 | 0.51 | 0.51 | 0.51 | 0.51 | 0.46 | 0.51 | 0.51 | 0.51 | 0.51 | 0.46 |
| R3/h | 0.7 | 0.7 | 0.5 | 0.7 | 0.7 | 0.7 | 0.7 | 0.7 | 0.62 | 0.7 | 0.7 | 0.7 | 0.62 |
| CW/W | 1.2 | 1.2 | 1.2 | 1.4 | 1.2 | 1.2 | 1.2 | 1.2 | 1.2 | 1.35 | 1.2 | 1.2 | 1.28 |
| Gauge reduction amount ≤ 0.025 × G0/mm | Satisfied | Satisfied | Satisfied | Satisfied | Not Satisfied | Satisfied | Satisfied | Satisfied | Satisfied | Satisfied | Satisfied | Satisfied | Satisfied |
| Gauge at H3/Wc (%) | 12 | 12 | 12 | 12 | 12 | 8 | 12 | 12 | 12 | 12 | 12 | 10 | 10 |
| Presence of recess | Not Present | Present | Present | Present | Present | Present | Present | Present | Present | Present | Present | Present | Present |
| Rolling resistance (index) | 100 | 130 | 133 | 127 | 145 | 148 | 125 | 127 | 129 | 120 | 125 | 130 | 135 |
| Steering stability (index) | 100 | 33 | 33 | 50 | 17 | 17 | 117 | 117 | 117 | 109 | 117 | 117 | 133 |

As apparent from the results shown in Table 1, each one of the tires of Examples 1 to 7 showed improved rolling resistance and steering stability as compared to the tires of

The invention claimed is:

1. A pneumatic tire comprising: a pair of bead cores respectively embedded in a pair of bead portions, and a carcass including at least one carcass ply toroidally extending between the pair of bead cores, wherein:

when the tire is mounted to an applicable rim and at an unloaded state while a normal maximum internal pressure is applied, a tire widthwise maximum width of the carcass is 1.35 W or less, where W is a tire widthwise distance between each bead heel of the pair of bead portions; and when the tire is mounted to the applicable rim and at the unloaded state while substantively no internal pressure is applied, in a cross section along the tire width direction, a tire outer surface has a recess on the inner side in a tire radial direction with respect to a tire maximum width position and on the outer side in the tire radial direction with respect to a separation point of the tire outer surface of the bead portions from a rim flange, when h is a tire radial maximum height of the carcass, and when a first height position H1, a second height position H2 and a third height position H3 are height positions spaced respectively by 0.10 h, 0.26 h and 0.48 h from a tire radial innermost position of the carcass toward the outer side in the tire radial direction, a radius of curvature of the carcass is 0.46 h or more within a second height range h2 from a first height position H1 to a second height position H2 and on the outer side in the tire radial direction with respect to the bead cores, and the radius of curvature of the carcass is 0.62 h or more within a third height range h3 from the second height position H2 to the third height position H3, and when a bead core height position Hbc is a tire radial outermost height position of a virtual point on the carcass with respect to the tire radial innermost position of the carcass in the case where a normal line of the carcass at the virtual point on the carcass penetrates the bead core, and when G0 is a tire gauge measured along the normal line of the carcass at the virtual point at the bead core height position Hbc, a tire gauge measured along the normal line of the carcass at the virtual point is reduced by a reduction amount of $0.025 \times G0$/mm or less during movement of the virtual point along the carcass from the bead core height position Hbc toward the third height position H3, and the gauge at the virtual point located at the third height position H3 is 10% or more of the tire widthwise maximum width of the bead core.

2. The pneumatic tire according to claim 1, wherein the carcass includes folded-up portions folded up around the bead cores from the inner side in the tire widthwise direction toward the outer side in the tire widthwise direction, and an end of the folded-up portion of the carcass is located on the inner side in the tire radial direction with respect to the tire radial outermost position of the rim flange.

3. The pneumatic tire according to claim 2, wherein the folded-up portion of the carcass includes wound portions which are wound around the bead cores along the circumference of the bead cores.

4. The pneumatic tire according to claim 1, wherein within the second height range h2 and on the outer side in the tire radial direction with respect to the bead cores, the radius of curvature of the carcass is 0.51 h or more, while a center of curvature of the carcass is located on the tire inner side with respect to the carcass.

* * * * *